United States Patent
Gorce et al.

(10) Patent No.: US 11,946,385 B2
(45) Date of Patent: Apr. 2, 2024

(54) METHOD FOR CONTROLLING THE BENDING DEFORMATION OF A TURBOMACHINE SHAFT AT REST SUBJECTED TO THE RESIDUAL HEAT OF OPERATION OF THE TURBOMACHINE

(71) Applicant: SAFRAN AIRCRAFT ENGINES, Paris (FR)

(72) Inventors: Clément Georges Henri Gorce, Moissy-Cramayel (FR); Emelian Charles François Vsevolod Evqueny Tichtchenko, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 126 days.

(21) Appl. No.: 17/426,357

(22) PCT Filed: Jan. 29, 2020

(86) PCT No.: PCT/FR2020/050137
§ 371 (c)(1),
(2) Date: Jul. 28, 2021

(87) PCT Pub. No.: WO2020/157432
PCT Pub. Date: Aug. 6, 2020

(65) Prior Publication Data
US 2022/0098997 A1 Mar. 31, 2022

(30) Foreign Application Priority Data
Jan. 29, 2019 (FR) ..................................... 1900805

(51) Int. Cl.
*F01D 25/34* (2006.01)
*F01D 21/00* (2006.01)
(Continued)

(52) U.S. Cl.
CPC ............ *F01D 25/34* (2013.01); *F01D 21/003* (2013.01); *F01D 21/08* (2013.01); *F01D 21/14* (2013.01);
(Continued)

(58) Field of Classification Search
CPC ........ F01D 21/00; F01D 21/003; F01D 21/04; F01D 21/06; F01D 21/08; F01D 25/34;
(Continued)

(56) References Cited

U.S. PATENT DOCUMENTS

| 8,820,046 B2* | 9/2014 | Ross ....................... F01D 25/34 |
| | | 60/39.13 |
| 9,664,070 B1* | 5/2017 | Clauson .................. F01D 25/36 |

(Continued)

FOREIGN PATENT DOCUMENTS

| CN | 103644855 A | 3/2014 |
| CN | 103925018 A | 7/2014 |

(Continued)

OTHER PUBLICATIONS

International Search Report in International Application No. PCT/FR2020/050137, dated Jun. 4, 2020, with English translation (5 pages).

(Continued)

*Primary Examiner* — Alain Chau
(74) *Attorney, Agent, or Firm* — Bookoff McAndrews, PLLC

(57) ABSTRACT

A method for controlling the bending deformation of a turbomachine shaft at rest subjected to the residual heat of operation of the turbomachine, wherein the shaft is rotated at a rotation speed between 0.1 and 50 revolutions per minute depending on the bending deformation deflection of the shaft when the turbomachine is at rest.

6 Claims, 3 Drawing Sheets

(51) Int. Cl.
   *F01D 21/08* (2006.01)
   *F01D 21/14* (2006.01)
(52) U.S. Cl.
   CPC .... *F05D 2270/02* (2013.01); *F05D 2270/114* (2013.01); *F05D 2270/331* (2013.01); *F05D 2270/44* (2013.01); *F05D 2270/821* (2013.01)
(58) Field of Classification Search
   CPC .......... F01D 25/36; F02C 7/268; F02C 7/275; F02C 7/277
   See application file for complete search history.

(56) References Cited

U.S. PATENT DOCUMENTS

| | | | | |
|---|---|---|---|---|
| 10,358,936 | B2* | 7/2019 | Hockaday | F01D 19/02 |
| 10,787,933 | B2* | 9/2020 | Clauson | F01D 25/34 |
| 10,801,371 | B2* | 10/2020 | Clauson | F02C 7/275 |
| 2011/0232294 | A1* | 9/2011 | Ross | F02C 7/26 |
| | | | | 60/773 |
| 2016/0118777 | A1 | 4/2016 | Schleif et al. | |
| 2016/0376917 | A1* | 12/2016 | Bancalari | F01D 5/12 |
| | | | | 416/61 |
| 2017/0234231 | A1* | 8/2017 | Virtue, Jr | F01D 25/34 |
| | | | | 416/1 |
| 2017/0234233 | A1* | 8/2017 | Schwarz | F02C 7/06 |
| | | | | 60/204 |
| 2017/0234238 | A1* | 8/2017 | Schwarz | F01D 21/00 |
| | | | | 60/778 |
| 2017/0363012 | A1* | 12/2017 | Clauson | F02C 7/275 |
| 2018/0010480 | A1 | 1/2018 | Hockaday et al. | |
| 2018/0274390 | A1* | 9/2018 | Clauson | F01D 21/00 |
| 2018/0340475 | A1 | 11/2018 | Grigorov et al. | |
| 2019/0178165 | A1* | 6/2019 | Chiasson | F01D 21/08 |
| 2019/0178847 | A1* | 6/2019 | Lovejoy | G01B 7/14 |

FOREIGN PATENT DOCUMENTS

| | | |
|---|---|---|
| CN | 108696181 A | 10/2018 |
| FR | 3007459 A1 | 12/2014 |
| JP | H09222001 A | 8/1997 |
| JP | 2012241536 A | 12/2012 |

OTHER PUBLICATIONS

Written Opinion of the International Searching Authority in International Application No. PCT/FR2020/050137, dated Jun. 4, 2020, with English translation (9 pages).

Office Action issued in corresponding Chinese Application No. 202080011578.0, dated Jan. 11, 2024.

\* cited by examiner

[Fig. 1]
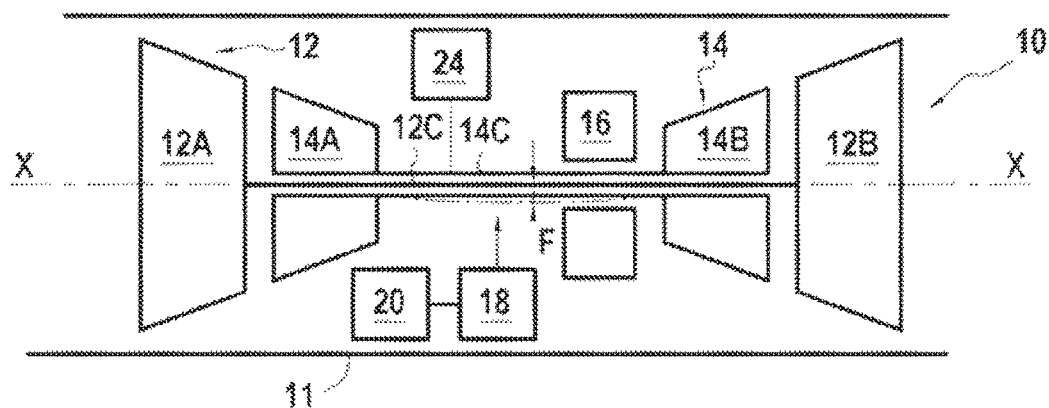
[Fig. 2]
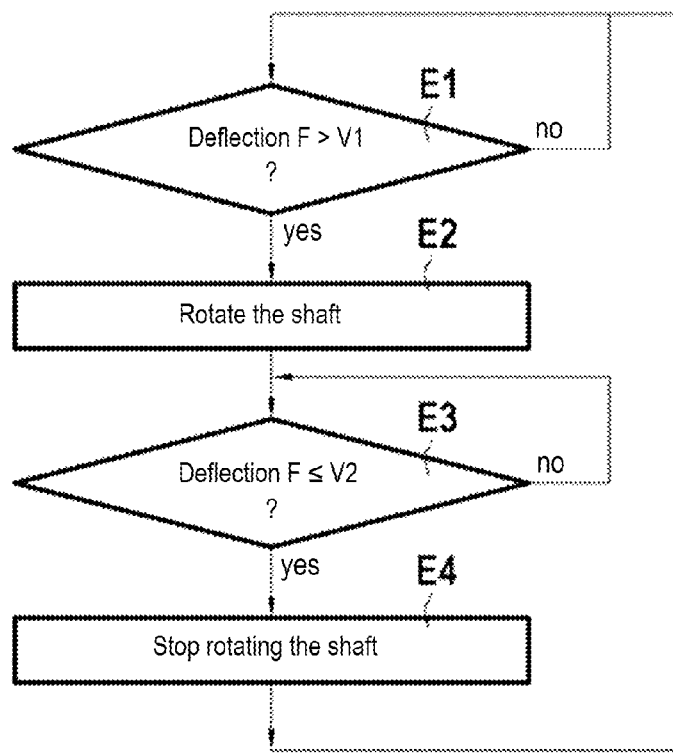

[Fig. 3]
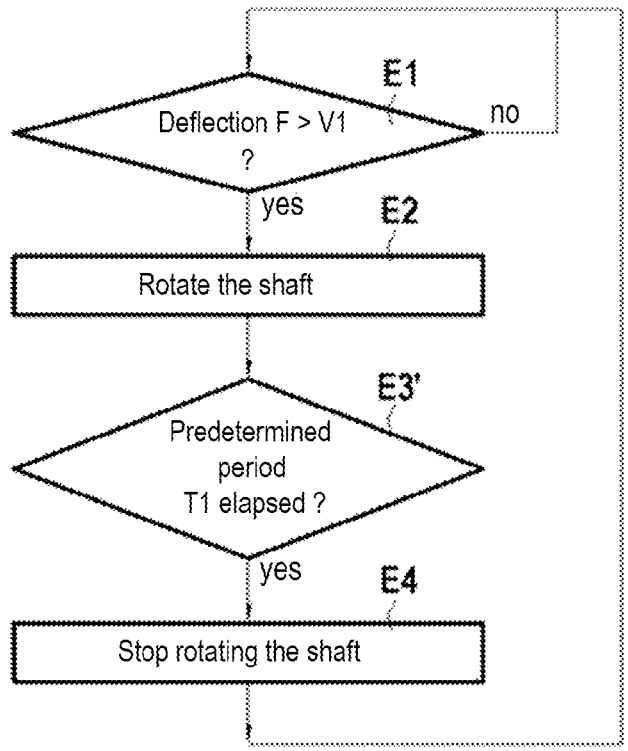
[Fig. 4]
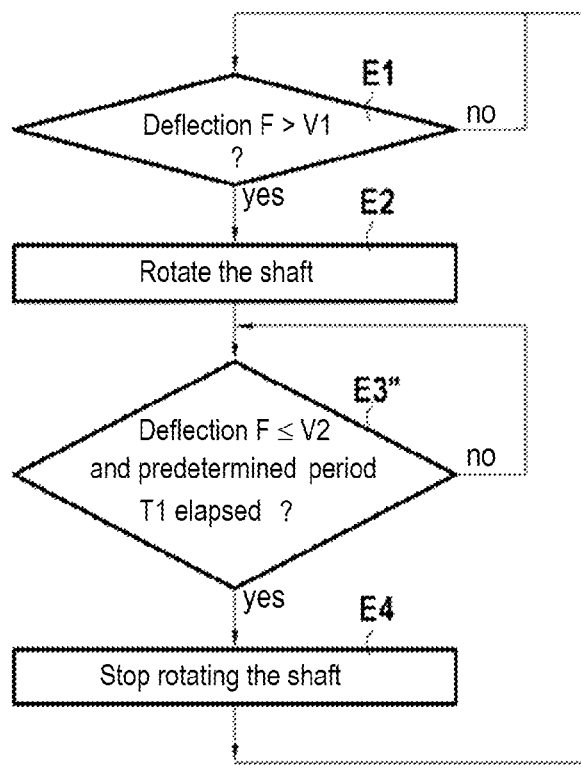

[Fig. 5]
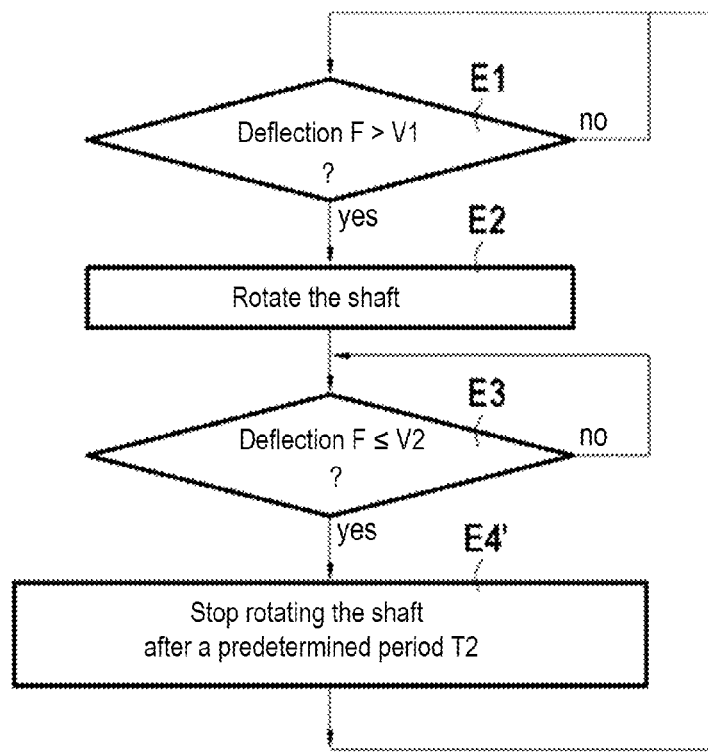
[Fig. 6]
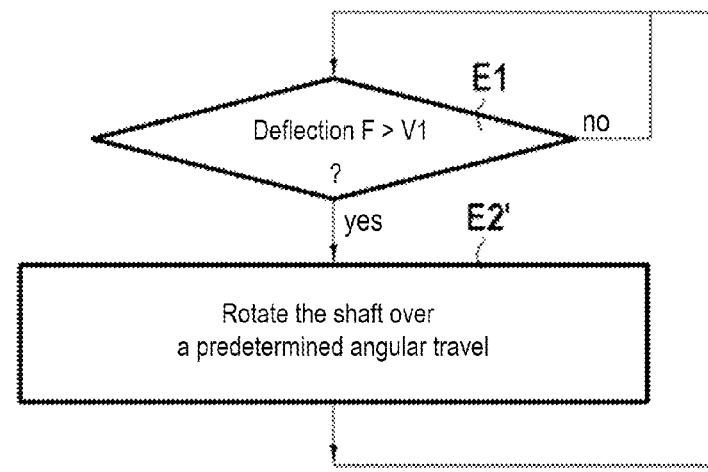

METHOD FOR CONTROLLING THE BENDING DEFORMATION OF A TURBOMACHINE SHAFT AT REST SUBJECTED TO THE RESIDUAL HEAT OF OPERATION OF THE TURBOMACHINE

CROSS-REFERENCE TO RELATED APPLICATION(S)

This application is the U.S. national phase entry under 35 U.S.C. § 371 of International Application No. PCT/FR2020/050137, filed on Jan. 29, 2020, which claims priority to French Patent Application No. 1900805, filed on Jan. 29, 2019.

TECHNICAL FIELD

The present disclosure relates to a method of controlling the bending deformation of a turbomachine shaft at rest, subjected to the residual heat of operation of the turbomachine.

The term "turbomachine" designates all gas turbine machines producing driving power, among which are distinguished in particular turbojets supplying thrust necessary for propulsion by reaction to the ejection at high speed of hot gases, and turboshaft engines in which the driving power is supplied by the rotation of an engine shaft. For example, turboshaft engines are used as engines for helicopters, vessels, trains or even as industrial engines. Turboprops (turboshaft engines driving a propeller) are also turboshaft engines used as airplane engines.

It is considered that a turbomachine is at rest when the combustion chamber is extinguished, while it is operational when the combustion chamber is ignited.

PRIOR ART

Turbomachines such as turbojets have a recurring problem of dissipating heat when at rest. In fact, during their operation, turbomachines store a considerably quantity of heat, particularly in areas in proximity to their combustion chamber, which must be dissipated. During operation, the rotation of the rotor provides for dissipation of this heat. However, once the turbomachine is at rest, the dissipation of the stored heat poses several problems.

In fact, the heat stored, particularly in the combustion chamber, will naturally propagate through the turbomachine, and will then, by a convection phenomenon, localize itself essentially in the upper portion of the turbomachine. The result is a heterogeneous dilation of the different components, and particularly of the shaft of the high-pressure turbine, which causes a phenomenon of bending of the shaft which is commonly designated by the name of "bowed rotor," this phenomenon being the greater if the shaft has an extended length and the operating temperature of the turbomachine increases.

Conventional solutions for correcting this phenomenon consist of extending the starting time of the turbomachine, the heat then being dissipated by the ventilating effect produced by the starter. Such extended starting methods are no longer acceptable, however, given the constraints imposed for the starting of turbomachines, particularly due to the increase in aerial traffic. It is recalled that in the principle of ventilation, based on the evacuation of calories from the engine, the rotation of the shaft is greater than 100 revolutions per minute.

The present disclosure thus seeks to propose a solution allowing at least a partial response to this problem.

DISCLOSURE OF THE INVENTION

One embodiment relates to a turbomachine comprising a casing and a shaft movable in rotation with respect to the casing, a drive system configured to drive the shaft in rotation when the turbomachine is at rest, a sensor configured to measure a bending deformation deflection of the shaft when the turbomachine is at rest, and a control unit configured, when the turbomachine is at rest, to actuate the drive system when the deformation deflection of the shaft measured by the sensor is greater than a first predetermined value.

One embodiment relates to a method controlling the bending deformation of a turbomachine shaft at rest subjected to the residual heat of operation of the turbomachine, in which the shaft is rotated at a rotation speed comprised between 0.1 and 50 revolutions per minute only when the deflection is greater than a first predetermined value.

For example, the turbomachine shaft is the shaft of the high-pressure spool, but not necessarily. It is understood that the deflection of the shaft is its maximum bending deformation with respect to the axis of the shaft. The deflection therefore varies depending on the bending of the shaft. It is also understood that the shaft is rotated around its axis with respect to a fixed (or stator) portion of the turbomachine, for example the casing of the turbomachine.

By rotating the shaft while the turbomachine is at rest, the temperature of the shaft is homogenized, which allows reducing and/or controlling the phenomenon of shaft bending due to thermal effects. Moreover, by controlling the rotation of the shaft depending on the deflection of the shaft, the shaft may be rotated only if it is considered to be necessary. This allows optimizing the energy consumed by the system dedicated to driving the shaft in rotation when the turbomachine is at rest. Moreover, by tolerating a certain deflection, therefore a certain bending deformation, the shaft is rotated only when it is considered that it is really necessary, i.e. when the deflection becomes too great. This allows optimizing the energy consumed by the system dedicated to driving the shaft in rotation when the turbomachine is at rest.

In some embodiments, the shaft is rotated at a rotation speed comprised between 0.1 and 20 revolutions per minute, or between 0.1 and 10 revolutions per minute, or between 0.1 and 5 revolutions per minute, or between 0.1 and 2 revolutions per minute, or equal to 1 revolution per minute.

These rotation speeds are advantageous for avoiding the phenomenon of shaft bending due to thermal effects while conserving the energy reserves of the system dedicated to driving the shaft in rotation when the turbomachine is at rest.

In some embodiments, rotating the shaft is stopped after a first predetermined period counted from the time where the deflection becomes greater than the first predetermined value.

In some cases, it may be considered that after the predetermined period, the temperature of the shaft is sufficiently homogenized so that the deflection of the shaft is again permissible, and it is therefore possible to stop the rotation of the shaft. Of course, it is possible to systematically stop the shaft after the predetermined period, or to consider other cumulative condition(s), for example verifying that the deflection has again become less than the first predetermined value.

In some embodiments, rotating the shaft is stopped when the deflection is less than or equal to a second predetermined value, the second predetermined value being less than or equal to the first predetermined value.

When the deflection has again become less than the second predetermined value, it is certain that the deflection of the shaft has again reached a permissible level because the second value is less than or equal to the first predetermined value. It is therefore possible to stop the rotation of the shaft. By setting a second predetermined value less than the first predetermined value, a certain margin is provided before a possible new deformation which would exceed the permissible so threshold, resulting in preserving the dedicated system for driving the shaft in rotation when the turbomachine is at rest (fatigue cycles, etc.) and the energy reserves for this system. For example, the second value is 30% less than the first predetermined value.

In some embodiments, rotating the shaft is stopped after a second predetermined period, counted from the time where the deflection becomes less than the second predetermined value.

A second predetermined period of this type is a delay time, which allows stabilizing the value of the deflection with respect to the second predetermined value. This reinforces the stability of the control, which allows preserving the dedicated system for driving the shaft in rotation when the turbomachine is at rest (fatigue cycles, etc.) and the energy reserves for the system.

In some embodiments, the shaft is rotated over a predetermined angular travel, for example 180° (i.e. a half-turn) when the deflection is greater than the first predetermined value.

As the residual heat of the turbomachine at rest accumulates essentially in the upper portion of the turbomachine, it is known that it is always the upper portion of the shaft which is subjected to the greater heat flux. By rotating the shaft over a predetermined angular travel, a half-turn for example, a colder portion of the shaft, for example the coldest portion of the shaft, is placed at the hottest location of the turbomachine and conversely, a hotter portion of the shaft, for example the hottest portion of the shaft, is placed at the coldest location of the turbomachine. The temperature of the shaft is thus "naturally" homogenized, with a minimum of intervention. This allows preserving the dedicated system for driving the shaft in rotation when the turbomachine is at rest (fatigue cycles, etc.) and the energy reserves for this system.

In some embodiments, the deflection is measured and the shaft is rotated depending on the result of the measurement.

The measurement of the deflection may be direct, for example by means of a distance or distance variation sensor, or indirect, for example by means of a sensor of a parameter indicating deflection, such as for example a temperature at a certain point, for example the temperature of the oil of the turbomachine, the behavior of the shaft depending on the temperature of said point being otherwise known.

In other words, control is carried out according to a closed control loop, the deflection being regularly measured and the shaft being driven in rotation, or not, depending on the measurement result at each measurement time.

In some embodiments, the shaft is rotated depending on a predetermined predictive model.

It is understood that the predetermined predictive model is a recorded digital model representing the behavior of the shaft as a function for example of the time elapsed since the moment when the turbomachine was stopped, the last operating conditions of the turbomachine prior to stopping, and external conditions (temperature, humidity, etc.).

In other words, control is carried out according to an open control loop, the deflection being predicted at each instant from the model, and the shaft is driven in rotation, or not, depending on the predicted value of the deflection. Control of this type allows dispensing with sensors, which simplifies the dedicated system for driving the shaft in rotation when the turbomachine is at rest.

One embodiment relates to a computer program including instructions for the execution of the method according to any one of the embodiments described in the present disclosure.

This program may use any programming language, and be in the form of source code, object code or intermediate code between the source code and the object code, such as in a partially compiled form, or in any other desirable form.

One embodiment relates to a recording medium readable by a computer, on which the computer program according to the present disclosure is recorded.

The recording medium may be any entity or device capable of storing a program. For example, the medium may include a storage means, such as a ROM, for example a CD-ROM or a microelectronic circuit ROM, or a magnetic recording means, for example a diskette ("floppy disc") or a hard disk.

Alternatively, the recording medium may be an integrated circuit into which the program is incorporated, the circuit being adapted to execute or to be used in the execution of the method in question.

BRIEF DESCRIPTION OF THE DRAWINGS

FIG. 1 is a schematic view of a turbomachine.

FIG. 2 shows a flowchart describing different steps of a method of controlling the deflection according to a first embodiment.

FIG. 3 shows a flowchart describing different steps of a method for controlling the deflection according to a second embodiment.

FIG. 4 shows a flowchart describing different steps of a method for controlling the deflection according to a third embodiment.

FIG. 5 shows a flowchart describing different steps of a method of controlling the deflection according to a fourth embodiment.

FIG. 6 shows a flowchart describing different steps of a method for controlling the deflection according to a fifth embodiment.

DESCRIPTION OF THE EMBODIMENTS

FIG. 1 shows schematically a turbomachine 10, a turbojet in this example, comprising a casing 11 accommodating a low-pressure spool 12, a high-pressure spool 14 and a combustion chamber 16. The low-pressure spool 12 comprises a low-pressure compressor 12A and a low-pressure turbine 12B coupled in rotation by a shaft 12C. The high-pressure spool 14 comprises a high-pressure compressor 14A and a high-pressure turbine 14B coupled in rotation by a shaft 14C. The shaft 12C is coaxial with the shaft 14C, and extends through the shaft 14C. The operation of these different components is well known, and will not be described in more detail here.

The shafts 12C and 14C are rotatable with respect to the casing 11 around their common axis X. As indicated in the introduction to the present disclosure, these shafts are likely to bend due to the heat accumulated in the turbomachine during operation, the dissipation of which is not ensured once the turbomachine is at rest. In particular, the bending of the shaft 14C is manifested in a deflection F, measured in this example by a sensor 18. For example, the deflection F is on the order of ten mils (1 mil=0.0254 mm), for a shaft the length of which is comprised between 2 m and 3 m (two meters and three meters). A computer (or control unit) 20 receives the measurements carried out by the sensor 18 and proceeds with the control of the bending deformation of the shaft 14C depending on the measured deflection F.

It is understood that the computer 20 comprises in particular a processor, a random access memory, a read-only memory and a nonvolatile flash memory (not shown). The read-only memory of the computer 20 forms a recording medium, readable by the processor and on which is recorded one or more computer program(s) including instructions for the execution of the steps of the method of controlling the bending deformation of the shaft 14C of the turbomachine 10 described hereafter with reference to FIG. 2.

When the turbomachine 10 is at rest, the computer 20 executes the program for implementing the method for controlling the bending deformation of the shaft 14C, depending on the deflection F.

In step E1, the deflection F of the shaft 14C is measured by means of the sensor 18. If the deflection is greater than a first predetermined value V1, then the procedure continues with step E2 and the shaft 14C is rotated at a speed comprised between 0.1 and 50 revolutions per minute. This rotation is performed for example by a drive system 24 embedded within the turbomachine 10, for example an electric motor which is otherwise known. If the deflection is less than the first predetermined value V1, then no action is carried out (i.e. the shaft 14C is not rotated), and the procedure returns to the beginning of step E1.

According to a first variant, there is not sensor 18, and the computer 20 has in its member a predictive model representing the behavior of the shaft 14C. In this case, the real deflection is not measured during step E1, but rather the theoretical value of the deflection is determined based on the predictive model. When the theoretical deflection becomes greater than the first predetermined value V1, then step E2 is initiated and the shaft 14C is rotated at a speed comprised between 0.1 and 50 revolutions per minute. If the theoretical deflection is less than or equal to the first predetermined value V1, then no action is taken (i.e. the shaft 14C is not rotated), and the procedure continues at the beginning of step E1.

After beginning to rotated the shaft 14C (step E2), the procedure continues with step E3. During step E3, the deflection F is measured by means of the sensor 18 (or, according to the first variant, the theoretical value of the deflection is estimated), and verification is made as to whether the deflection is less than or equal to a second predetermined value V2, less in this example than the first predetermined value V1. If the deflection is less than or equal to the second predetermined value V2, the procedure continues with step E4 and the rotation of the shaft 14C is stopped. If the deflection is greater than the second predetermined value V2, then no action is taken (i.e. the shaft 14C is allowed to continue rotating), and the procedure returns to the beginning of step E3.

According to one variant shown in FIG. 3, during step E3', a first predetermined period T1 is measured from the time where the shaft 14C begins to rotate (i.e. the time where the deflection becomes greater than the first predetermined value V1), then the procedure continues with step E4 and the rotation of the shaft 14C is stopped at the end of the first predetermined period T1, independently of the value of the deflection. According to another variant shown in FIG. 4, the procedure continues with step E4 and the rotation of the shaft 14C is stopped at the end of the first predetermined period T1 and when the deflection is less than or equal to the second predetermined value V2 (see step E3").

According to yet another variant shown in FIG. 5, in step E4' the rotation of the shaft 14C is stopped at the end of a second predetermined period T2 counted from the time where the deflection becomes less than or equal to the second predetermined value V2. After step E4, when the rotation of the shaft 14C is stopped, the procedure continues with step E1.

According to another variant shown in FIG. 6, there are no steps E3 and E4, and the shaft 14C is rotated over a predetermined angular travel, for example 180°, during step E2'. The procedure then returns directly to step E1 after step E2'.

Although the present invention has been described by referring to specific embodiments, it is obvious that modifications and changes can be carried out on these examples without departing from the general scope of the invention as described by the claims. In particular, individual features of the different embodiments illustrated/mentioned can be combined into additional embodiments. Consequently, the description and the drawings can be considered in an illustrative, rather than a restrictive sense. For example, the description refers to a two spool double flow turbojet, but the present disclosure is applicable to any type of turbomachine (for example, but not solely, a turboshaft engine), with any type of structure (for example, but not solely, one spool single flow).

It is also obvious that all the features described with reference to a method are transposable, alone or in combination, to a device, and conversely, all the features described with reference to a device are transposable, alone or in combination, to a method.

The invention claimed is:

1. A turbomachine comprising a casing and a shaft that is movable in rotation with respect to the casing, a drive system configured to drive the shaft in rotation when the turbomachine is at rest, a sensor configured to measure a bending deformation deflection of the shaft when the turbomachine is at rest, and a control unit, the control unit being configured, when the turbomachine is at rest, to actuate the drive system when the deformation deflection of the shaft measured by the sensor is greater than a first predetermined value, and to stop rotating the shaft when both the deflection is less than or equal to a second predetermined value, the second predetermined value being less than the first predetermined value, and at the end of a second predetermined period counted from the time where the deflection becomes smaller than the second predetermined value.

2. A method for controlling the bending deformation of a turbomachine shaft at rest subjected to the residual heat of operation of the turbomachine, wherein the shaft is rotated at a rotation speed comprised between 0.1 and 50 revolutions per minute only when a bending deformation deflection of the shaft is greater than a first predetermined value, wherein rotating the shaft is stopped when both the deflection of the shaft is less than or equal to a second predetermined value, the second predetermined value being less than the first predetermined value, and at the end of a second predetermined period counted from the time where the deflection of the shaft becomes less than the second predetermined value.

3. The method according to claim 2, wherein the second predetermined value is 30% less than the first predetermined value.

4. The method according to claim 2, wherein the deflection of the shaft is measured, and the shaft is rotated depending on the result of the measurement.

5. The method according to claim 2, wherein the shaft is rotated depending on a predetermined predictive model.

6. A non-transitory computer readable medium storing a computer program including instructions for the execution of the method according to claim 2, when said computer program is executed on a computer.

\* \* \* \* \*